(12) United States Patent  (10) Patent No.: US 7,573,232 B2
Cheng et al.  (45) Date of Patent: Aug. 11, 2009

(54) BATTERY EXCHANGE APPARATUS AND METHOD FOR UNINTERRUPTIBLE POWER SUPPLY

(75) Inventors: Szu-Che Cheng, Bade (TW);
Sheng-Hung Chu, Tainan (TW);
Fu-yung Hsueh, Taipei (TW)

(73) Assignee: American Power Conversion Corporation, West Kingston, RI (US)

( * ) Notice: Subject to any disclaimer, the term of this patent is extended or adjusted under 35 U.S.C. 154(b) by 326 days.

(21) Appl. No.: 10/637,312

(22) Filed: Aug. 8, 2003

(65) Prior Publication Data
US 2005/0029984 A1 Feb. 10, 2005

(51) Int. Cl.
*H02J 7/00* (2006.01)
*H02B 1/00* (2006.01)
*E04G 21/06* (2006.01)

(52) U.S. Cl. .................. 320/115; 307/64; 361/600; 429/65

(58) Field of Classification Search ......... 320/112–115, 320/123, DIG. 35; 307/64–66; 429/65; 361/600
See application file for complete search history.

(56) References Cited

U.S. PATENT DOCUMENTS

| | | | | |
|---|---|---|---|---|
| 5,928,003 A | * | 7/1999 | Kajinuma | 439/74 |
| 6,121,695 A | * | 9/2000 | Loh | 307/64 |
| 6,489,561 B2 | * | 12/2002 | Ziegler et al. | 174/72 A |
| 2002/0105230 A1 | * | 8/2002 | Ziegler et al. | 307/64 |

* cited by examiner

*Primary Examiner*—Akm E Ullah
*Assistant Examiner*—Alexis Boateng
(74) *Attorney, Agent, or Firm*—Lando & Anastasi, LLP.

(57) ABSTRACT

An uninterruptible power supply comprises an input to receive input power from a power source, an output to provide power to a load from at least one of the input power and the battery, a battery having a plurality of terminals, an upper housing portion having a plurality of receptacle plugs, the receptacle plugs having battery connectors positioned therein, and a lower housing portion constructed and arranged to hold the battery in one of two positions. The first position is an activated position wherein the terminals on the battery match with the battery connectors of the upper housing. The second position is an inactive position wherein the terminals on the battery do not match with the battery connectors of the upper housing.

43 Claims, 7 Drawing Sheets

BATTERY EXCHANGE APPARATUS AND METHOD FOR UNINTERRUPTIBLE POWER SUPPLY

FIELD OF THE INVENTION

Embodiments of the present invention are related to uninterruptible power supply systems having batteries, and more particularly to a battery exchange device and method for rapid exchange of a battery in an uninterruptible power supply system.

BACKGROUND OF THE INVENTION

Uninterruptible power supplies are used in many electrical and electronic systems to protect against loss or degradation of operation in the event of a utility power outage. Typical UPS systems include back-up batteries, standalone generators or other alternate power sources that may be brought on-line should an AC utility source fail to meet predetermined voltage or other performance criteria, e.g., under "brownout" and "blackout" conditions. In addition, UPS systems commonly include power conditioning circuits that are designed to reduce spikes, frequency variations, voltage excursions and other irregularities that are often present on AC utility lines. The back-up batteries provide power for computers and other electronic equipment when the main power is shut off so that the equipment is not damaged and so that data is not lost due to lack of continuous power to the equipment.

Typically, UPS systems are shipped with the battery disconnected to avoid unwanted use of the battery's power, and further to avoid injuries that can occur when current is being supplied to the electronic device. Thus, one shipping a UPS must take precautions to insure that the battery is disconnected, and the user of the system, upon receiving the UPS, must manually connect the battery to the UPS for use.

Batteries used in UPS systems are generally lead acid batteries manually connected to the UPS system. For example, the connections may involve manipulation of the leads or terminals of the battery during disconnection and reconnection of the battery in the UPS. To avoid injury to the user and damage to the system from a faulty battery, great care must be taken in connecting or replacing a battery in a UPS. This often requires that the system be powered down for a substantial amount of time so that the battery leads are appropriately connected.

SUMMARY OF THE INVENTION

The present invention relates to an improved connection between a battery and the load to which it supplies power when the utility power is not available. More specifically, the invention is directed to an uninterruptible power supply battery exchanging system whereby manual manipulation of the battery leads is not necessary to connect the battery. The invention further provides improved means of storing a battery as it is shipped to avoid accidental connection of the battery to the UPS system.

Embodiments of the invention include an uninterruptible power supply. The uninterruptible power supply includes an input to receive AC input power from a power source, a housing having a battery compartment, wherein the battery compartment includes at least one battery connector, a battery positionable in a first position in the battery compartment, the battery including terminals positioned in a plug receptacle, and an output to provide power to a load from at least one of the input power and the battery. The battery terminals correspond to a position of the at least one battery connector to self-align, by insertion of the at least one battery connector into the plug receptacle, when the battery is in the first position in the battery compartment.

Implementations of the invention can include one or more of the following features. The uninterruptible power supply can include a printed circuit board disposed in the housing, wherein the connectors are mounted on the printed circuit board. The connectors can include curved portions to contact the battery terminals. The terminals can include curved portions that correspond with the curved connectors to complete connection. The housing can further defines a cavity to receive the battery terminals. The battery can be disposed in a second position in the housing, and the connectors can be disposed remotely from the terminals when the battery is in the second position. The second position of the battery in the housing can be a 180-degree rotation from the first position of the battery. The cavity can be positioned on an internal surface of a door that attaches to the bottom of the housing, and the door can be configured to enclose the battery in the housing.

Other embodiments of the invention can include an uninterruptible power supply comprising a battery having a plurality of terminals. The UPS includes an upper housing portion having a plurality of receptacle plugs, the receptacle plugs having battery connectors positioned therein and a lower housing portion to hold the battery in one of two positions. The first position is an activated position wherein the terminals on the battery match with the battery connectors of the upper housing. The second position is an inactive position wherein the terminals on the battery do not match with the battery connectors of the upper housing. The UPS further includes an input to receive input power from a power source, and an output to provide power to a load from at least one of the input power and the battery.

Implementations of the invention can include one or more of the following features. The uninterruptible power supply can include a printed circuit board disposed in the battery housing, wherein the means for providing contact is mounted on the printed circuit board. The means for providing contact can include j-shaped members mounted to the battery housing. The means for providing contact also include j-shaped members mounted to the battery. The j-shaped members mounted to the battery housing can slide into contact with the j-shaped members mounted to the battery. The j-shaped members mounted to the battery can be angled in the direction of motion of the battery when the battery is inserted into the housing.

Further implementations of the invention can include cavity means defined by the housing for receiving the j-shaped members mounted to the battery. The cavity means for receiving the j-shaped members mounted to the battery can be positioned to receive the j-shaped members when the battery is inserted in a second position, and in the second position, the j-shaped members mounted to the battery housing can be disposed remotely from the j-shaped members mounted to the battery. The second position of the battery can include rotating the battery 180 degrees from the first position of the battery. The cavity means can be defined in a bottom surface of the housing and can receive the j-shaped members mounted to the battery when the battery is inverted prior to insertion into the housing. The system can further include means for indicating an operating status of the battery when the battery is connected to the uninterruptible power supply.

Other embodiments of the invention can include an uninterruptible power supply having an upper housing portion having plugs and a lower housing portion that couples to the upper housing portion. The UPS can also include a printed circuit board positioned below the upper housing portion and above the lower housing portion, the printed circuit board having connectors extending below the planar surface of the printed circuit board, and a battery, removably secured in the lower housing portion, the battery having contacts to mate with the connectors on the printed circuit board to self align in a first position of contact.

Embodiments of the invention can include one or more of the following advantages. The battery of uninterruptible power supply of the invention contains features that increase the efficiency and safety of exchanging a battery. The battery connectors self-align with the battery terminals for complete connection without necessitating manual intervention. The housing of the uninterruptible power supply further allows the battery to be rotated when inserted to avoid unwanted battery connection, which increases safety. Additional advantages of the invention will become apparent and the invention will be more fully understood after a review of the following figures, detailed description and claims.

BRIEF DESCRIPTION OF THE FIGURES

For a better understanding of the present invention, reference is made to the figures which are incorporated herein by reference and in which.

DETAILED DESCRIPTION OF THE INVENTION

Embodiments of the invention provide an uninterruptible power supply having a backup battery. Embodiments of the invention further provide a battery exchange system whereby the battery is replaceable merely by sliding the battery into position within a battery compartment with the connection of battery leads to the UPS contacts occurring automatically as the battery is slid into place. Embodiments of the invention can be used in computer systems, telecommunications applications and to satisfy other electronic system needs. Embodiments of the present invention can be used with systems other than computer systems and in systems other than uninterruptible power supplies.

Figure 1:
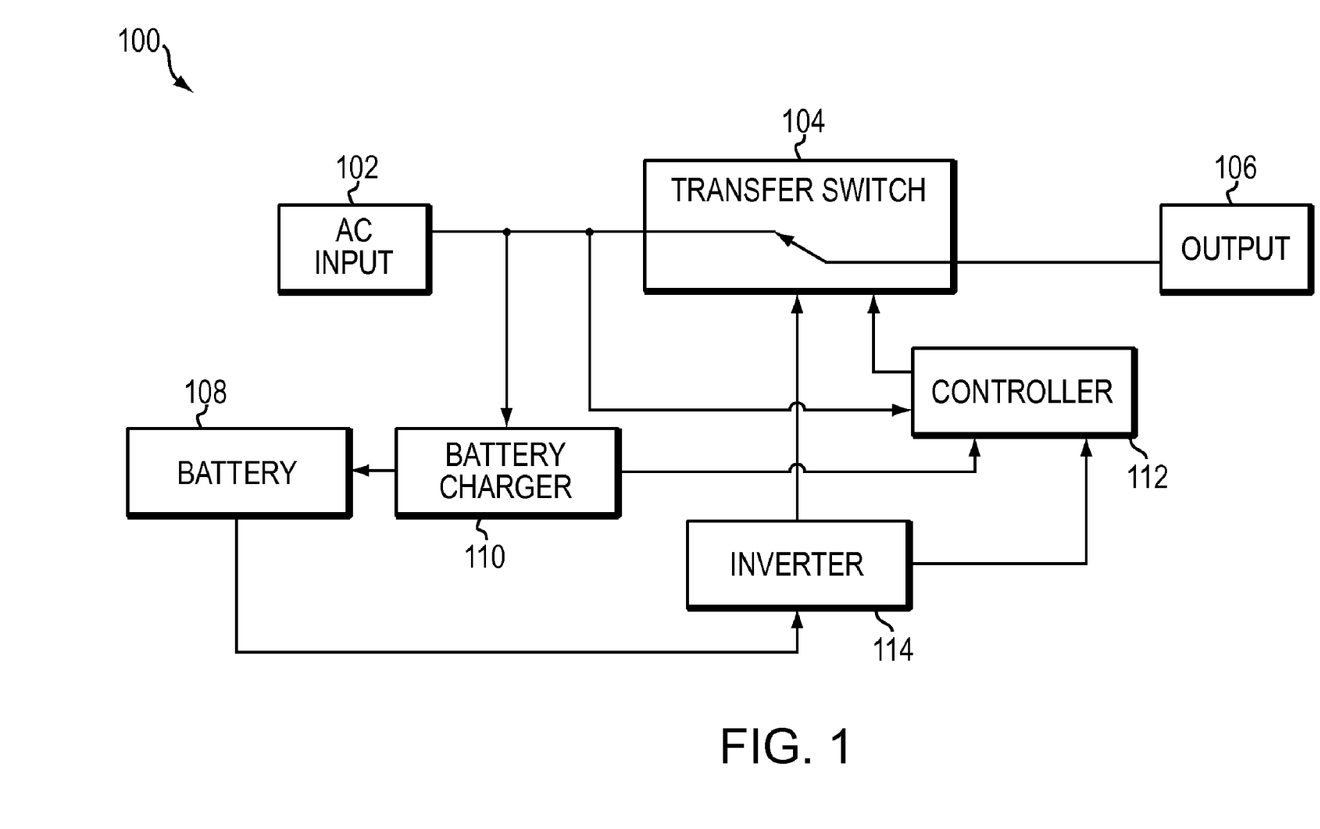
FIG. 1 is a block diagram of an uninterruptible power supply.

An uninterruptible power supply (UPS) provides surge protection and backup battery power for electronic systems. Backup battery power prevents loss of data that can occur during a blackout, a brownout (low voltage), or a spike or a surge of electricity through the system. Referring to FIG. 1, an example of a typical uninterruptible power supply 100 includes an input power source 102, a transfer switch 104, an output 106, a battery 108, a controller 112, and an inverter 114. The UPS 100 can include a battery charger 110, but need not. The input couples to an AC power source and the output 106 couples to a load. The input 102 provides power to the transfer switch 104 and the battery charger 110. The transfer switch receives AC power from the input and from the inverter 114. The inverter receives DC power from the battery and converts the DC power to AC power and provides AC power to the transfer switch. The controller 112 determines whether power is to be provided from the AC input or from the inverter, depending on allowable tolerances of the system. Depending on the capacity of the battery and the power requirements of the load, the UPS 100 can provide power to the load during brief AC power source "dropouts" or for extended power outages. The UPS 100 described herein is provided as an example of a typical off-line system, although other UPS systems can be used with embodiments of the invention.

Figure 2:
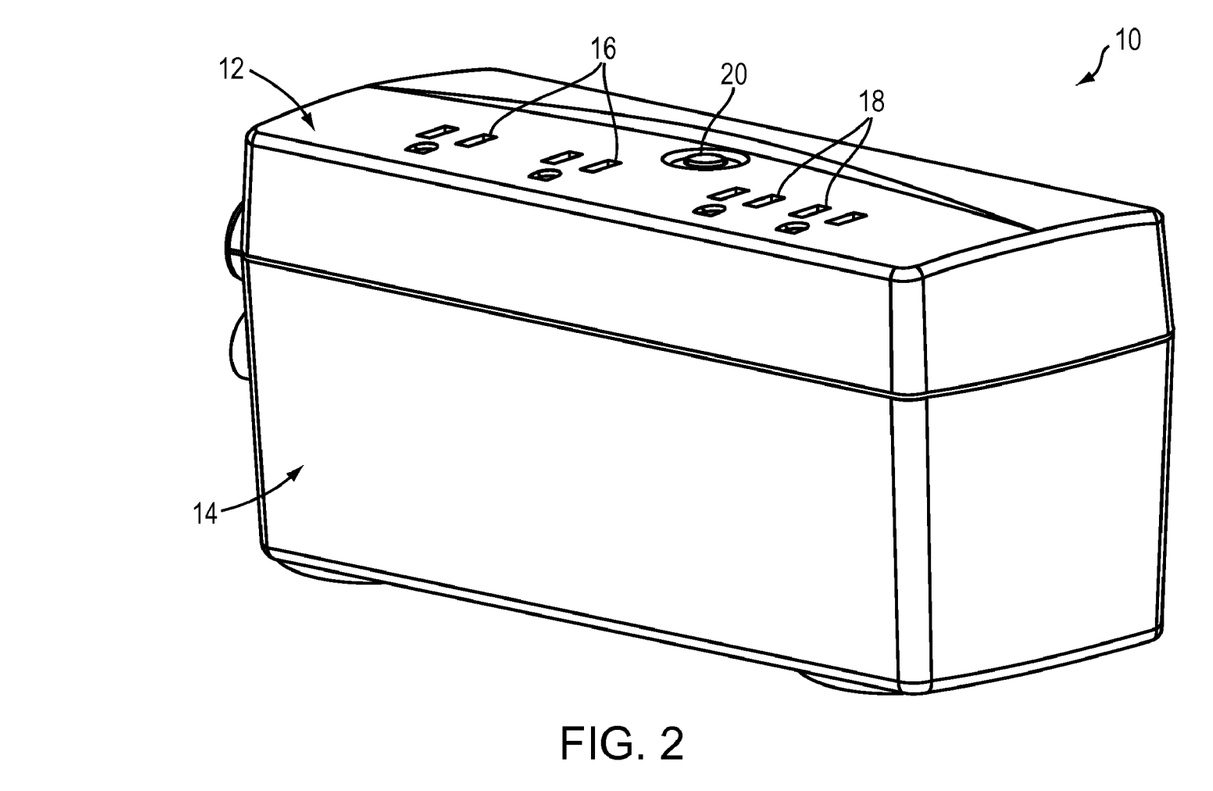
FIG. 2 is a perspective view of an uninterruptible power supply system in one embodiment of the invention.

Referring to FIG. 2, a UPS housing 10 used in embodiments of the invention is illustrated. The UPS housing 10 includes an upper enclosure 12, a lower enclosure 14, outlets 16 and 18, and a visual status indicator 20. The upper enclosure 12 and the lower enclosure 14 fit together to form the housing 10 of the UPS. Outlets 16 and 18 provide connection to the battery that can power equipment in the event of a power outage. In one embodiment, some of the outlets 16 and 18 can provide power surge protection only, while other outlets also provide a connection to the back-up battery. Outlets 16 are spaced sufficiently distant from one another that the outlets 16 can accept two transformer block plugs without interference. The visual status indicator 20 indicates when the unit is on, when the unit is operating on battery power, or when available battery power is almost exhausted. Other indicators, such as audible indicators can also be included in the UPS to notify the user of the status of the battery. Operating status information can be communicated remotely to appear on a monitor, for example, rather than appearing locally via the visual status indicator 20.

Figure 3:
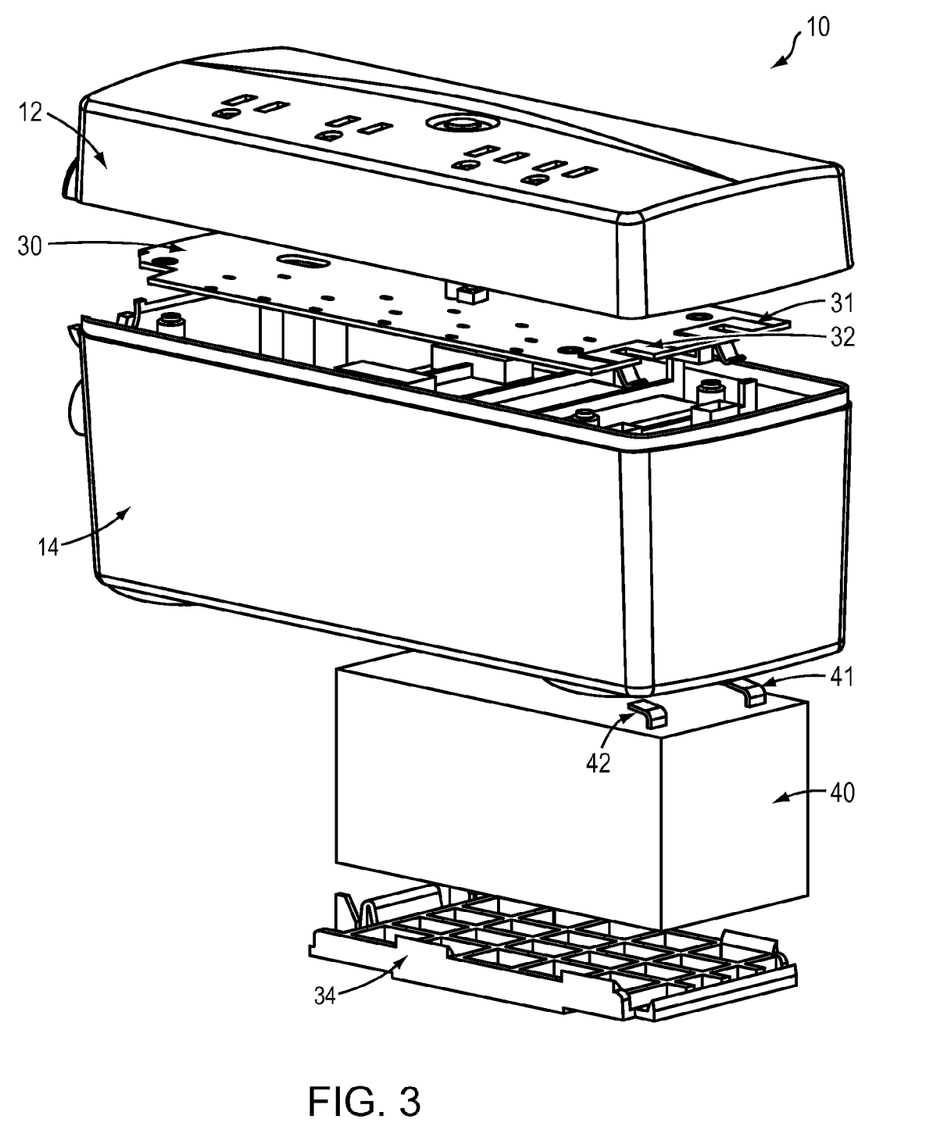
FIG. 3 is an assembly view of the uninterruptible power supply system with a battery in one embodiment of the invention.

FIG. 3 shows an assembly view of the UPS of FIG. 2. With like numbers referring to like embodiments, the UPS of FIG. 3 includes a battery 40 having two terminals 41 and 42, a battery door 34, a printed circuit board 30, and battery connectors 31 and 32, which may be mounted on the printed circuit board 30. The printed circuit board is positioned below the upper enclosure 12 and above the lower enclosure 14. The battery connectors 31 and 32 are mounted on an end of the printed circuit board 30 and face downward to mate with terminals 41 and 42. The terminals 41 and 42 are curved, or slightly hook-shaped or j-shaped to allow adequate contact with the connectors 31 and 32. Polarity indicators, such as red and black color blocks, may appear on the body of the battery 40 under or adjacent to the terminals 41 and 42 to indicate which terminal is a positive battery terminal and which terminal is a negative battery terminal.

The battery 40 is inserted into the lower enclosure 14 of the UPS housing 10 through the battery door 34, located on the bottom side of the lower enclosure 14. The battery door 34 can be removably connected to the lower enclosure, or it can be attached to the lower enclosure with hinges or other known methods of attachment.

The printed circuit board 30 may include electronic circuitry to provide some or all of the functions of the UPS described above. The battery connectors 31 and 32 may be made of bronze and may be soldered to the printed circuit board 30. The connectors 31 and 32 are preferably attached to one end of the circuit board 30. The connectors 31 and 32 are hook-shaped, or curved, and extend below the planar surface of the circuit board 30 in anticipation of contact with the battery terminals.

Figure 4:
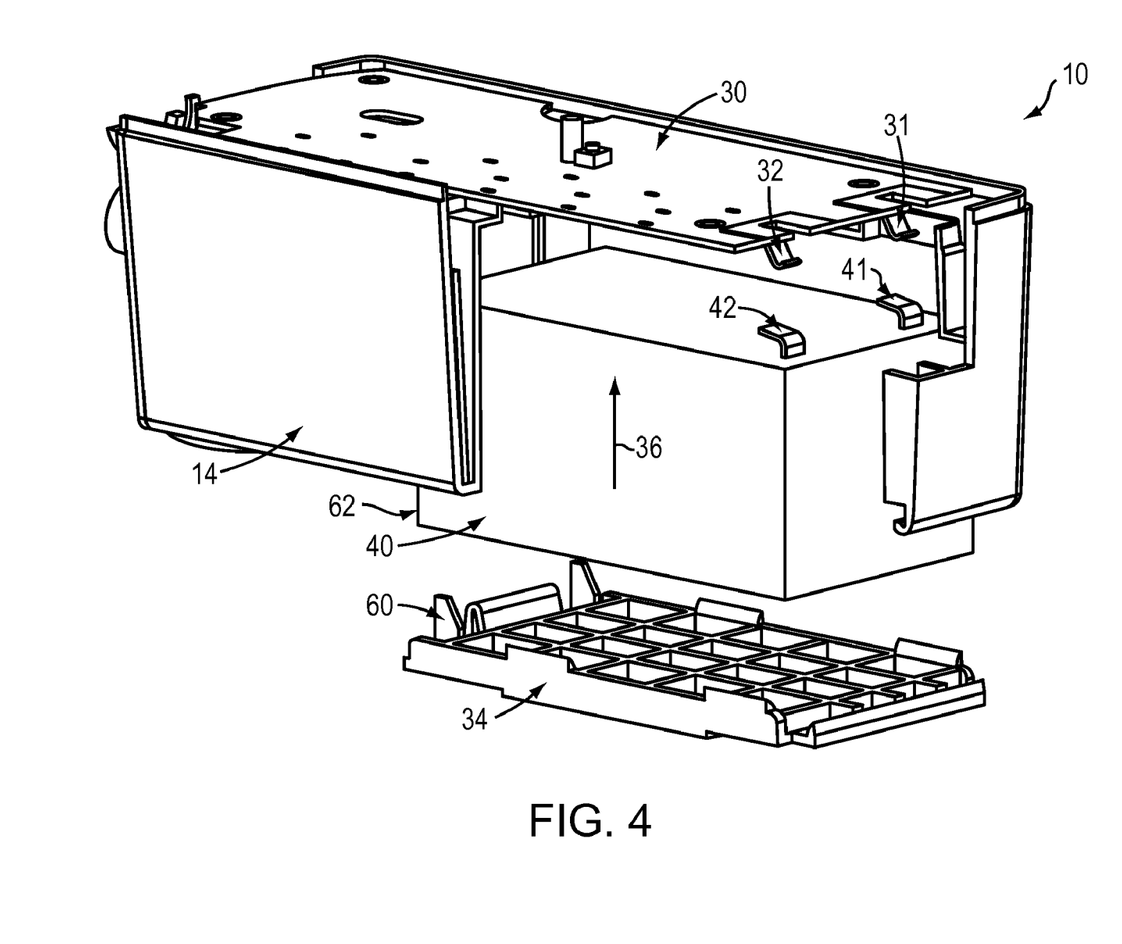
FIG. 4 is a schematic diagram of the battery assembly in one embodiment of the invention.

FIGS. 4-8 illustrate the battery in various stages of insertion into the housing 10 of the UPS system. In FIGS. 4-8, like numbers continue to refer to like embodiments. As shown in FIG. 4, to achieve connectivity, the battery 40 is inserted with the battery terminals 41 and 42 aligned below the connectors 31 and 32. The battery 40 is moved in the direction of arrow 36 into the housing when the battery door 34 is removed to allow access.

Figure 5:
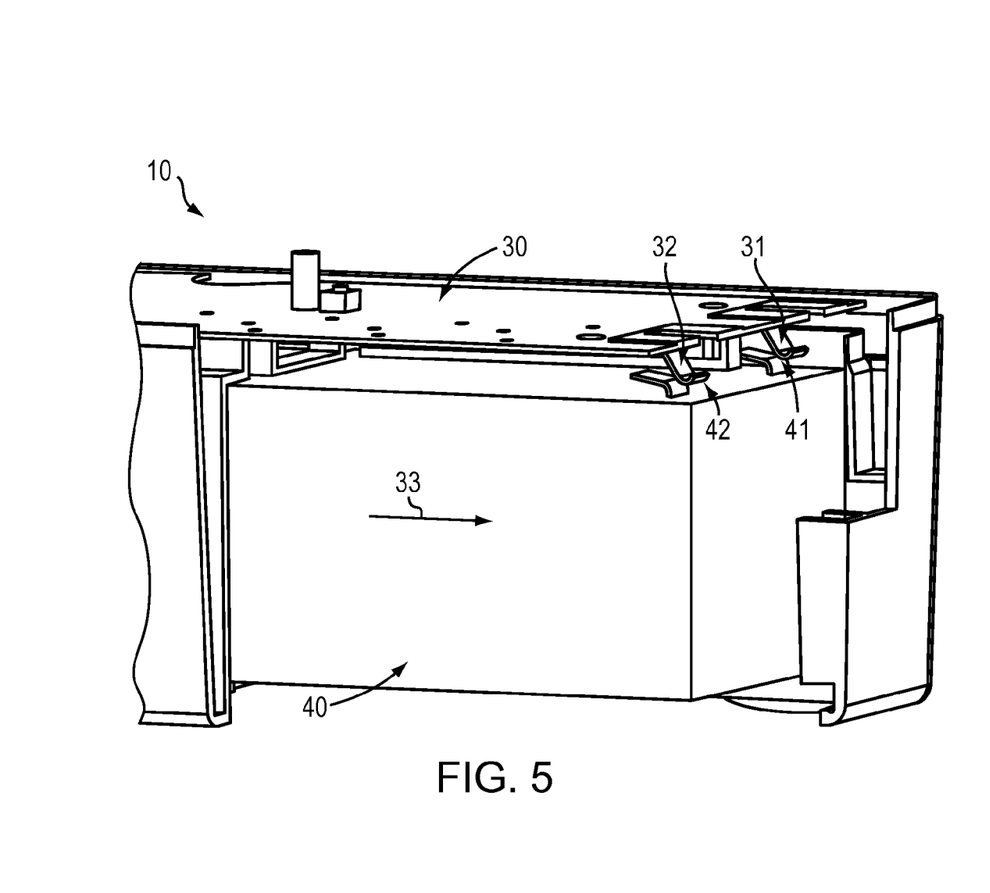
FIG. 5 is a schematic diagram of the battery before installation in an uninterruptible power supply system in one embodiment of the invention.
Figure 6:
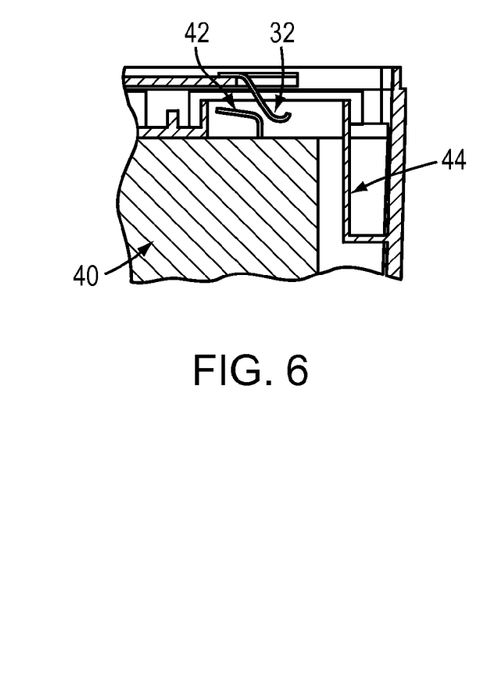
FIG. 6 is a schematic diagram of the battery connectors before contact in one embodiment of the invention.
Figure 7:
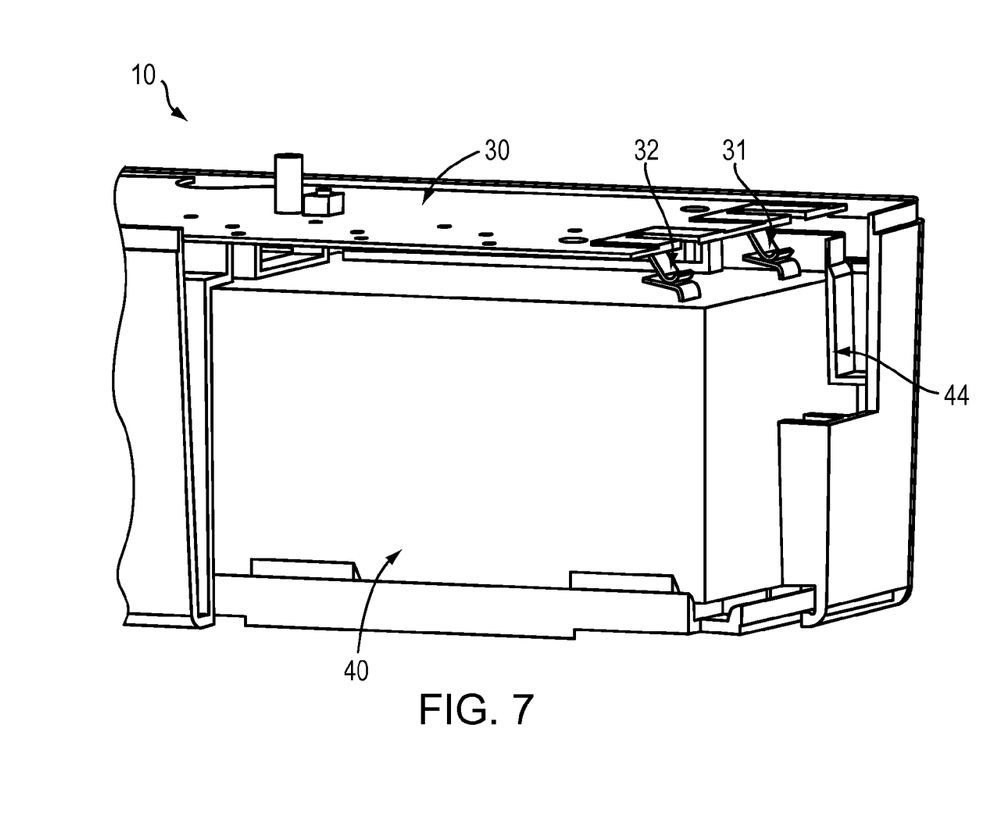
FIG. 7 is a schematic diagram of the battery installed in an uninterruptible power supply system in one embodiment of the invention.
Figure 8:
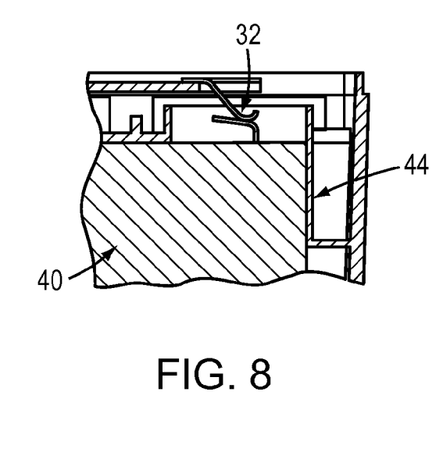
FIG. 8 is a schematic diagram of the battery connectors in contact in one embodiment of the invention.

In FIG. 5, the battery is vertically in position within the lower enclosure 14. The terminals 41 and 42, however, are not yet in contact with the connectors 31 and 32, highlighted in detail in FIG. 6. Contact is made when the battery 40 slides horizontally, or orthogonal to the direction of the insertion of the battery, in the direction of arrow 33, and abuts the sidewall 44 of the battery compartment. To ensure contact is made between the battery terminals and connectors, ribs 60 aid in positioning the battery horizontally within the compartment. Ribs 60 contact a side of the battery 62 and push the battery into contacting position. When the battery 40 and the side wall 44 are in contact, as shown in FIGS. 7 and 8, the battery terminals 41 and 42 are in contact with the connectors 31 and 32.

The curved shape of the connectors 31 and 32 in conjunction with the curved shape of the terminals 41 and 42 ensures a consistent connection between the connectors and terminals, and, thus, a secure battery connection for a steady supply of power. The curved shape of the connectors 31 and 32 accounts for some variability of the dimensions and alignment of the battery terminals and ensures that the battery connectors 31 and 32 make proper contact with the battery terminals 41 and 42. The connectors 31 and 32 slide over the surface of the terminals 41 and 42 until a contacting position of FIG. 8 is achieved. The connectors 31 and 32 flex slightly in reaction to the contact from the terminals, but are substantially stiff members so that pressure persists between the terminals and the connectors to keep constant contact, as shown in FIG. 8. In addition, the sliding motion of the terminals 41 and 42 over the connectors 31 and 32 wipes or scrapes any oxide that forms on the surface of the battery terminals.

Figure 9:
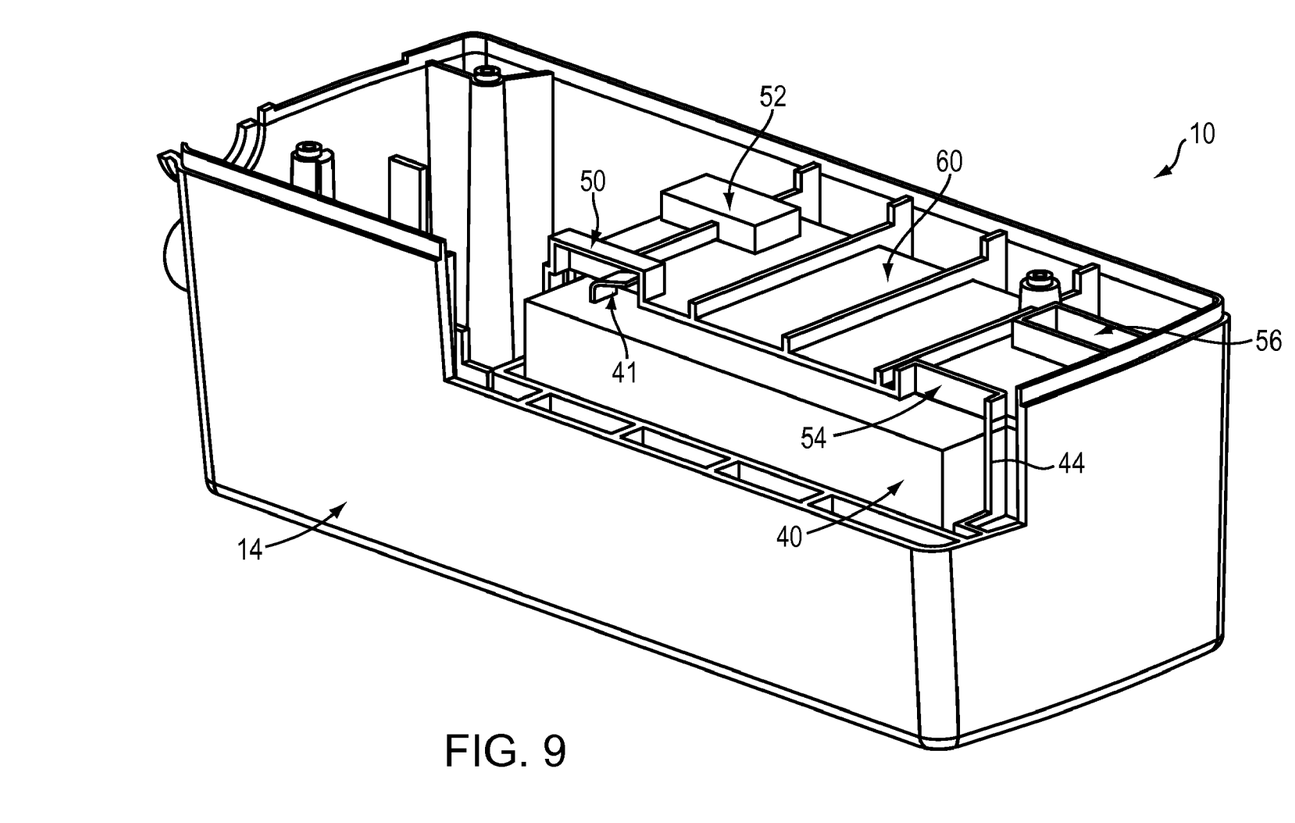
FIG. 9 is a schematic diagram of the uninterruptible power supply system with the top enclosure removed in one embodiment of the invention.

Referring to FIG. 9, additional features of the UPS housing 10 are shown. In FIG. 9, the internal components of the lower enclosure are shown, with the printed circuit board removed so that the internal design of the enclosure can be more clearly inspected. An issue often arising in UPS systems having batteries is the danger of a constant or an accidental connection of the battery, particularly when the UPS is shipped or otherwise transported. The ability to ship the UPS and battery while the battery is disconnected avoids the danger of injury associated with a live connection, and of wasting battery power. To ship the battery while the battery is disconnected and for efficient shipping, a panel 60 within the lower enclosure 14 includes cavities 50, 52, 54, and 56. The panel 60 is made of, for example, plastic, and is sized to form a battery compartment that receives the battery 40 when the battery 40 is placed in the UPS housing 10. Alternatively, the cavities 50, 52, 54, 56 can be included as part of the housing body itself.

Cavities 50 and 52 are enclosed housings in which the battery terminals 41 and 42 can be disposed when the battery is not connected to provide power to the UPS, such as, for example, when the UPS is being transported. Cavity 50 is shown in a cutaway view for the purpose of illustrating the placement of the battery terminal 41 in position in the cavity. Cavities 50 and 52 are positioned at one end of the panel 60. When the battery is rotated 180 degrees from a position of connectivity, i.e., when the battery is in a disconnected position in which the terminals and the connectors are not aligned, the terminals insert into cavities 50 and 52. The cavities 50 and 52 can be positioned to receive the battery when the battery is rotated at other angles, such as 30 degrees of rotation or 90 degrees of rotation. The cavities 50 and 52 protect the terminals and prevent accidental or inadvertent connection of the terminals and the connectors. The panel 60 having the cavities 50 and 52 saves space by allowing the battery to be shipped or stored in the compartment of the lower enclosure while the battery is not providing back-up power. When the user activates the UPS, he/she merely needs to open the hatch, flip the battery 180 degrees, and close the hatch again. In addition, injury to a user or damage to the UPS is avoided when the battery is rotated and placed in the lower enclosure.

Additional cavities 54 and 56 are positioned on the panel 60 on the opposite end from cavities 50 and 52. Cavities 54 and 56 are open to allow connection between the battery terminals and the connectors. To achieve connection, the battery is inserted into the lower enclosure 14 with the battery terminals 41 and 42 aligned below the connectors 31 and 32. The connectors 31 and 32 extend below the printed circuit board (shown in FIG. 4) and into cavities 54 and 56. The cavities 54 and 56 are, thus, open to accept the connectors 31 and 32 from the top, and to accept the terminals 41 and 42 from the bottom. The cavities 50, 52, 54, 56 can be positioned in a variety of ways on the panel to correspond to the position of the connectors 31, 32 and the terminals 41, 42.

Embodiments of the invention comprise cavities in the panel of the lower enclosure to receive the battery terminals and connectors, and the cavities are positioned on the ends of the panel. As will be apparent to one skilled in the art, the cavities can be positioned in other locations on the panel, such as in the center of the panel, so long as the cavities correspond to the position of the battery terminals and battery connectors. The cavities are used to protect the terminals during use of the battery or during storage of the battery. As is apparent, protectors, for example plastic enclosures, can be attached to the battery to surround the terminals, rather than or in addition to the cavities. The cavities can be designed to receive the plastic protectors encasing the terminals.

In embodiments of the invention, the cavities that protect the battery terminals are in the panel that is positioned between the printed circuit board and the battery. As can be envisioned by one skilled in the art, the cavities can be in the battery door that is attached to the lower enclosure below the battery. The cavities in the battery door can be positioned to accommodate the battery terminals. The battery can be turned upside down for storage and shipping purposes and the terminals can insert into cavities in the door.

In embodiments of the invention, the battery terminals and the battery connectors are curved, or hook-shaped. Other embodiments of the invention can include alternative shapes of the terminals and connectors. Either the terminals, or the connectors, or both, can be flat, for example.

In embodiments of the invention, the battery is placed in an uninterruptible power supply system for back-up power for the UPS. As will be apparent to one skilled in the art, the battery system including curved terminals to connect with curved connectors can be used as a primary source of power in portable electronic devices, as well as other electronic devices.

In embodiments of the invention as shown in FIG. 1, an off-line UPS configuration is depicted. As is apparent to one skilled in the art, other embodiments can be used in on-line UPS configurations, or any other type of UPS configuration accepting a battery as an alternate power source.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. An uninterruptible power supply comprising:
an input to receive input power from a power source;
a battery having a plurality of terminals and an axis extending through a center point of the battery;
an output to provide power to a load from at least one of the input power and the battery; and
a housing including:
an upper housing portion having a plurality of receptacle plugs and battery connectors positioned therein, wherein each of the battery connectors is configured to make contact with a corresponding one of the plurality of terminals; and
a lower housing portion constructed and arranged to receive the battery,
wherein the housing is configured to wholly enclose the battery within it in each of two orientations with respect to the axis including:
(1) a first orientation in which the battery is in a first rotational position relative to the axis and each of the plurality of terminals on the battery make contact with a corresponding one of the battery connectors; and
(2) a second orientation in which the battery is in a second rotational position relative to the axis and each of the plurality of terminals does not make contact with any of the battery connectors,
wherein the second rotational position is different than the first rotational position.

2. The uninterruptible power supply of claim 1 further comprising one or more cavities defined by at least one of the housings for receiving the plurality of terminals of the battery.

3. The uninterruptible power supply of claim 1 further comprising a printed circuit board disposed between the upper housing portion and the lower housing portion, wherein the battery connectors are mounted on the printed circuit board.

4. The uninterruptible power supply of claim 3 wherein the battery connectors include j-shaped members mounted to the upper housing.

5. The uninterruptible power supply of claim 4 wherein the plurality of terminals include j-shaped members mounted to the battery.

6. The uninterruptible power supply of claim 5 wherein the j-shaped members mounted to the upper housing slide into contact with the j-shaped members mounted to the battery.

7. The uninterruptible power supply of claim 6 wherein the j-shaped members mounted to the battery are angled in the direction of motion of the battery when the battery is inserted into the lower housing.

8. The uninterruptible power supply of claim 7 further comprising one or more cavities defined by the upper housing for receiving the j-shaped members mounted to the battery.

9. The uninterruptible power supply of claim 8 wherein the one or more cavities for receiving the j-shaped members mounted to the battery is positioned to receive the j-shaped members when the battery is inserted into the housing in the second orientation, and wherein in the second orientation, the j-shaped members mounted to the upper housing are disposed remotely from the j-shaped members mounted to the battery.

10. The uninterruptible power supply of claim 1 wherein the first rotational position and the second rotational position differ by 180 degrees of rotation about the axis.

11. The uninterruptible power supply of claim 9 further comprising one or more cavities that are defined in a bottom surface of the lower housing, wherein the one or more cavities are configured to receive the j-shaped members mounted to the battery when the battery is inserted into the housing in the second orientation.

12. The uninterruptible power supply of claim 11 further comprising means for indicating an operating status of the battery when the battery is connected to the uninterruptible power supply.

13. An uninterruptible power supply comprising:
a housing including;
an upper housing portion having plugs; and
a lower housing portion that couples to the upper housing portion;
a printed circuit board positioned in the housing, the printed circuit board having connectors extending from a planar surface of the printed circuit board; and
a battery received in the lower housing portion, the battery having contacts configured to self align and mate with the connectors, and an axis extending through a center of the battery;
wherein the housing is constructed and arranged to wholly enclose the battery in each of two positions:
(1) a first rotational position relative to the axis wherein the contacts on the battery make contact with the battery connectors; and
(2) a second rotational position relative to the axis wherein the contacts on the battery do not make contact with the battery connectors of the upper housing; and
wherein the first rotational position is different than the second rotational position.

14. The uninterruptible power supply of claim 13 wherein the connectors include j-shaped members.

15. The uninterruptible power supply of claim 14 wherein the contacts include j-shaped members mounted to the battery.

16. The uninterruptible power supply of claim 15 wherein the j-shaped members of the the connectors slide into contact with the j-shaped members mounted to the battery.

17. The uninterruptible power supply of claim 16 wherein the j-shaped members mounted to the battery are angled in the direction of motion of the battery when the battery is inserted into the lower housing.

18. The uninterruptible power supply of claim 17 further comprising one or more cavities defined by the upper housing for receiving the j-shaped members mounted to the battery.

19. The system of claim 18 wherein the one or more cavities for receiving the j-shaped members mounted to the battery is positioned to receive the j-shaped members when the battery is inserted in the second position, and wherein in the second position, the j-shaped members of the connector are disposed remotely from the j-shaped members mounted to the battery.

20. The system of claim 19 wherein the second position of the battery includes a rotation of the battery 180 degrees about the axis relative to the first position of the battery.

21. The system of claim 20 wherein the one or more cavities are defined in a bottom surface of the lower housing and receive the j-shaped members mounted to the battery when the battery is inverted prior to insertion into the lower housing.

22. The system of claim 21 further comprising an indicator to indicate an operating status of the battery when the battery is connected to the uninterruptible power supply.

23. An uninterruptible power supply comprising:
an input to receive AC input power from a power source;
a battery including a plurality of terminals and an axis extending through a center of the battery;
a housing including a battery compartment configured to wholly enclose the battery in each of a first rotational position and a second rotational position, a plurality of battery connectors, and a plurality of receptacles located therein; and
an output to provide power to a load from at least one of the AC input power and the battery,
wherein the battery terminals and the battery connectors self align and make contact with one another with the battery located in the first rotational position in the battery compartment; and
wherein an orientation of the battery in the second rotational position is different than an orientation of the battery in the first rotational position, and wherein the connectors are disposed remotely from the terminals when the battery is in the second rotational position.

24. The uninterruptible power supply of claim 23 further comprising a printed circuit board disposed in the housing, wherein the connectors are mounted on the printed circuit board.

25. The uninterruptible power supply of claim 24 wherein the connectors include curved portions to contact the battery terminals.

26. The uninterruptible power supply of claim 25 wherein the terminals include curved portions that correspond with the curved connectors to complete connection.

27. The uninterruptible power supply of claim 26 wherein the housing further defines a cavity to receive the battery terminals.

28. The uninterruptible power supply of claim 27 wherein the second rotational position differs from the first rotational position by a 180-degree rotation about the axis.

29. The uninterruptible power supply of claim 27 wherein the cavity is positioned on an internal surface of a door that attaches to the bottom of the housing, and wherein the door is configured to enclose the battery in the housing.

30. A method of converting a UPS from a storage configuration to an operational configuration, the method comprising acts of:
removing a battery positioned in a first rotational position in the UPS from a battery housing in the UPS that fully encloses the battery; the battery having a plurality of terminals and the battery housing having a plurality of connectors, wherein in the first rotational position, the plurality of connectors do not mate with the plurality of terminals; and
inserting the battery into the battery housing in the operational configuration, such that the battery is in a second rotational position with the battery fully enclosed in the housing and positioned such that the plurality of terminals mate with the plurality of connectors.

31. The method of claim 30 further comprising indicating a status of the battery when the battery is inserted into the housing of the uninterruptible power supply and connection is complete in the operational configuration.

32. The method of claim 31 wherein in the first rotational position, the terminals are disposed remotely from the connectors in the housing.

33. The method of claim 32 further comprising rotating the battery 180 degrees after removing the battery positioned in the second rotational position prior to inserting the battery into the housing in the first rotational position.

34. The method of claim 33 further comprising storing the battery in the housing by inverting the battery prior to inserting the battery into the housing in the first rotational position.

35. An uninterruptible power supply (UPS) comprising:
a battery including a positive battery connection and a negative battery connection;
a housing configured to receive the battery, the housing including a first cavity and a second cavity configured to receive the positive battery connection and the negative battery connection, respectively, with the battery wholly enclosed in the housing in a first orientation;
a first stationary contact configured to make contact with the positive battery connection in the first cavity;
a second stationary contact configured to make contact with the negative battery connection in the second cavity,
wherein the housing further includes a third cavity and a fourth cavity configured to receive the positive battery connection and the negative battery connection, respectively, with the battery wholly enclosed in the housing in a second orientation.

36. The UPS of claim 35, wherein the positive battery connection is included in a first terminal that is integral to the battery; and wherein the negative battery connection is included in a second terminal that is integral to the battery.

37. The UPS of claim 35, wherein the third and fourth cavities are configured to electrically isolate the positive battery connection and the negative battery connection, respectively, from all other electrical connections located in the housing when the battery is wholly enclosed in the housing in the second orientation.

38. The UPS of claim 35, further comprising a circuit board located in the housing, the circuit board including a planar surface containing components, wherein the planar surface is located in a horizontal position above the battery with the battery wholly enclosed in the housing.

39. The UPS of claim 38, wherein each of the first and second stationary contacts are included in the circuit board.

40. The UPS of claim 35, wherein a configuration of the UPS allows for a temporary removal of the battery from the housing when in the first orientation and a re-installation of the battery in the housing in the second orientation without a removal of any other current-carrying component from the housing other than the battery.

41. The UPS of claim 40, further comprising a battery door located beneath the battery when the battery is wholly enclosed in the housing.

42. The uninterruptible power supply of claim 3, wherein the contact surface is located on an underside of the printed circuit board.

43. The uninterruptible power supply of claim 10, wherein the axis is a horizontal axis.

* * * * *

UNITED STATES PATENT AND TRADEMARK OFFICE
CERTIFICATE OF CORRECTION

PATENT NO. : 7,573,232 B2
APPLICATION NO. : 10/637312
DATED : August 11, 2009
INVENTOR(S) : Cheng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 424 days.

Signed and Sealed this

Fourteenth Day of December, 2010

David J. Kappos
*Director of the United States Patent and Trademark Office*